(12) United States Patent
Dowlaty et al.

(10) Patent No.: US 9,286,380 B2
(45) Date of Patent: Mar. 15, 2016

(54) SOCIAL MEDIA DATA ANALYSIS SYSTEM AND METHOD

(71) Applicants: Zubin Dowlaty, Alpharetta, GA (US); Gaurav Jain, Bangalore (IN)

(72) Inventors: Zubin Dowlaty, Alpharetta, GA (US); Gaurav Jain, Bangalore (IN)

(73) Assignee: Musigma Business Solutions PVT. LTD., Bengaluru (IN)

( * ) Notice: Subject to any disclaimer, the term of this patent is extended or adjusted under 35 U.S.C. 154(b) by 0 days.

(21) Appl. No.: 13/748,465

(22) Filed: Jan. 23, 2013

(65) Prior Publication Data
US 2013/0191395 A1 Jul. 25, 2013

(30) Foreign Application Priority Data

Jan. 23, 2012 (IN) .............................. 278/CHE/2012

(51) Int. Cl.
G06F 17/30 (2006.01)
G06Q 50/00 (2012.01)
G06Q 30/02 (2012.01)

(52) U.S. Cl.
CPC ...... *G06F 17/30713* (2013.01); *G06Q 30/0278* (2013.01); *G06Q 50/01* (2013.01)

(58) Field of Classification Search
None
See application file for complete search history.

(56) References Cited

U.S. PATENT DOCUMENTS

| 2010/0119053 | A1* | 5/2010 | Goeldi | 707/E17.108 |
| 2010/0138310 | A1* | 6/2010 | Coleman et al. | 705/26 |
| 2012/0036085 | A1* | 2/2012 | Srivastava et al. | 705/348 |
| 2012/0101965 | A1* | 4/2012 | Hennig et al. | 706/12 |

* cited by examiner

*Primary Examiner* — Son T Hoang
(74) *Attorney, Agent, or Firm* — Harness, Dickey & Pierce

(57) ABSTRACT

A system analyzes data to determine an activity around a product. The system includes a user interface configured to enable one or more data analysts to provide input data and an acquisition module coupled to user interface and configured to retrieve social media data in response to the input data. The social media data is received from one more social media platforms. The system further includes processing circuitry coupled to the acquisition module and includes an analysis module configured to analyze the social media data to generate processed data and classify the processed data based on a plurality of criteria and a visualization module coupled to the analysis module and configured to generate a plurality of visual representations of classified data.

15 Claims, 8 Drawing Sheets

| Group Name | Agent Name | All Tweets Count | Positive Tweets | Negative Tweets | Neutral Tweets |
|---|---|---|---|---|---|
| Misc | FAS Tracker | 0 | 0 | 0 | 0 |
| HP | Ink | 0 | 0 | 0 | 0 |
| position2 | position2 | 5 | 0 | 1 | 3 |
| UAL | UAL Test | 9 | 3 | 2 | 5 |
| HP | Printer | 11 | 3 | 1 | 1 |
| Walgreens | Walgreen | 423 | 61 | 42 | 232 |
| HP | Touchpad | 458 | 80 | 10 | 42 |
| Misc | Big Data | 179 | 19 | 5 | 18 |
| rates | Rupee | 255 | 46 | 21 | 78 |
| Apple | Siri | 3517 | 409 | 406 | 934 |
| Dell | Dell | 4823 | 842 | 138 | 893 |
| Microsoft | MSFT | 5830 | 645 | 163 | 972 |
| Microsoft | Xbox | 8123 | 935 | 480 | 3329 |
| Movies | MI4 | 11277 | 1454 | 407 | 5870 |
| HP | HP | 37293 | 2777 | 513 | 11594 |

SOCIAL MEDIA DATA ANALYSIS SYSTEM AND METHOD

BACKGROUND

The present invention is related to data analysis systems and techniques. More particularly the present invention is related to analyzing data received from various social media platforms to assist in forming a strategy for various products and businesses.

In recent times, there is increasing awareness of the role of social media in influencing customers and business stakeholders. The presence of social media platforms has matured to becoming a key component of marketing strategy. The increasing volume of information existing on social media platforms such as Facebook, Twitter, etc. available today reinforces the need to develop the correct strategy for customers. Factors like social buzz, trends, consumer feedback and opinion, market sentiments need to be integrated into any business decision.

Most business organizations are now keen to accurately identify its online customer base, effectively communicate with their existing customers, understand a tone of market response to their business, manage vast expanse of information and, discover the impact of social media on the overall business.

However, some of the important challenges with existing solutions are the difficulty in accurately identifying impact sources for business outcomes and objectives and aligning social media intelligence with business goals. There is also an inability to present statistics in a comprehensible way to users. Moreover, managing vast expanses of data to derive meaningful insights to support business processes and use cases are also hard to achieve.

Therefore, there is a need for a system and a method that can process information retrieved from various social media platforms to determine a response to a business or a product. Also, there is a need to represent and classify such information in an accurate and effective way to users, which will enable them to make the right business decisions.

SUMMARY

Briefly, according to one embodiment of the invention, a system for analyzing data to determine an activity around a product is provided. The system comprises a user interface configured to enable one or more data analysts to provide input data and an acquisition module configured to retrieve social media data in response to the input data. The social media data is received from one or more social media platforms. The system further comprises processing circuitry coupled to the acquisition module and comprises an analysis module configured to analyze the social media data to generate processed data and classify the processed data based on a plurality of criteria and a visualization module coupled to the analysis module and configured to generate a plurality of visual representations of classified data.

In another embodiment, a method for analyzing data received from a plurality of social media platforms is provided. The method comprises retrieving social media data from the plurality of social media platforms based on input data provided by one or more data analysts, processing the social media data by applying one or more text analysis models to generate text data. The method further includes classifying the text data based on one or more criteria and generating one or more visual representations of the processed data based on the one or more criteria.

In another embodiment, a computer program containing computer executable instructions for analyzing data, comprising at least one computer readable medium and code stored on the at least one computer readable medium encoding routines is provided. The computer program includes routines for receiving social media data from a plurality of sources based on an input data, processing the social media data to generate text data by applying one or more text analysis models. Further, the text data is classified based on one or more criteria; wherein the one or more criteria comprise a positive sentiment, a neutral sentiment and a negative sentiment. One or more visual representations of the text data are generated based on the one or more criteria. In addition, a plurality of key influencers contributing to a behavior of the social media data is determined and a plurality of alerts is generated based on the input data.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
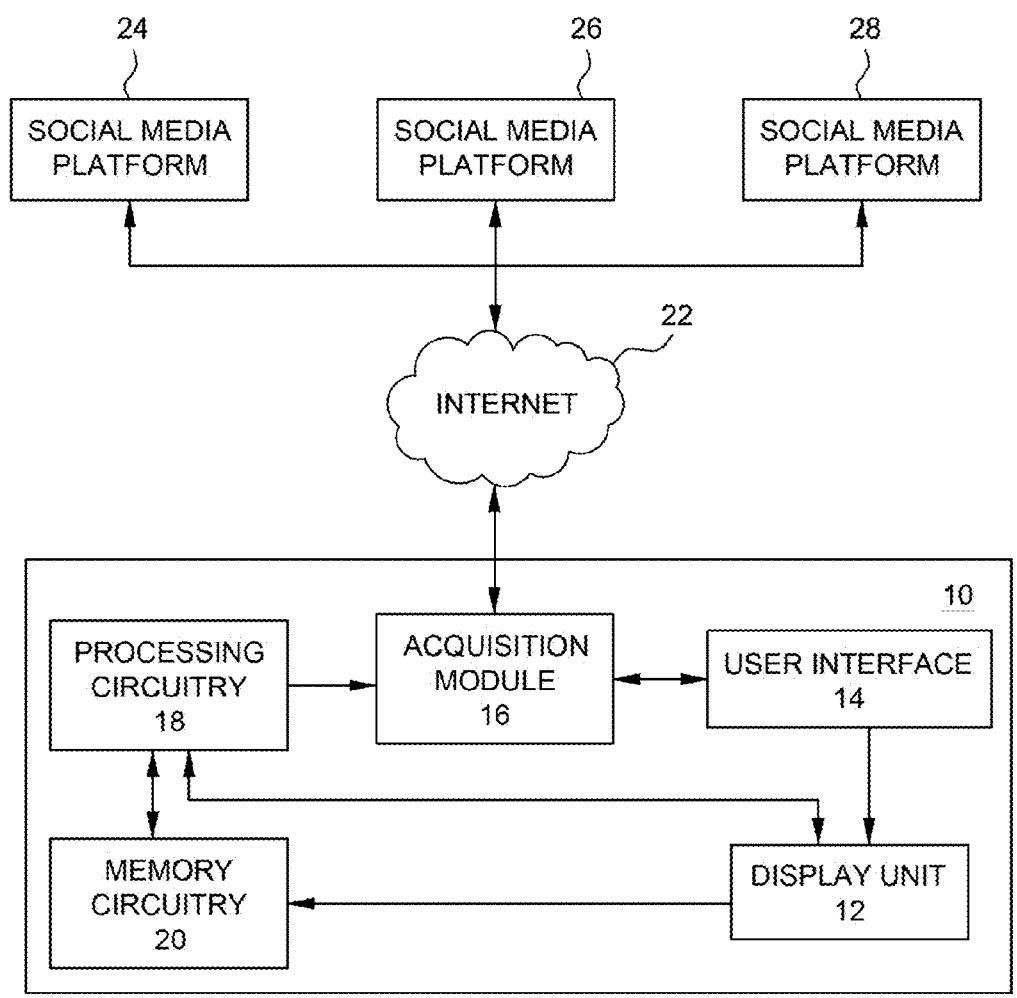
FIG. 1 is a block diagram of an embodiment of a data analysis system implemented according to aspects of the present technique.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Example embodiments are generally directed to data analysis systems for analyzing data received from several sources. The following description is with reference to analyzing data received from various social media platforms, however it should be understood that the techniques described herein may be applied in for data received from other sources such as the World Wide Web, various databases, and the like.

FIG. 1 is a block diagram of an embodiment of a data analysis system in communication with various social media platforms. The data analysis system 10 is configured to analyze social media data retrieved from various social media sources to determine an activity around a product or a business. Each block of the data analysis system 10 is described in further detail below.

The data analysis system 10 is configured to connect with various social media platforms 24, 26 and 28 through a communication networks such as the Internet 22. Examples of social media platforms include Facebook, Twitter and the like. For the purposes of this specification and claims, the term "social media platform" may relate to any type of computerized mechanism through which persons may connect or communicate with each other. Some social media platforms may be applications that facilitate end-to-end communications between users in a formal manner. Other social networks may be less formal, and may consist of a user's email contact list, phone list, mailing list, or other database from which a user may initiate or receive communication. Also, it may be noted that, the term "user" may refer to both natural people and other entities that operate as a "user". Examples include corporations, organizations, enterprises, teams, or other group of peoples.

The data analysis system 10 includes a user interface 14, which is configured to enable one or more data analysts to provide input data. As used herein, a data analyst refers to an entity that performs data analysis on social media data. The user interface may include various types of devices such as keyboards, etc. Input data may include keywords, trade names of a particular product, names of organizations, etc. In one embodiment, the input data is provided to the data analysis system via a graphical user interface that is displayed on display unit 12.

Acquisition module 16 is configured to retrieve social media data in response to the input data that was provided by the users. As used herein, "social media data" refers to data present in the various social media platforms such as text data, user profiles, geographic locations, and the like.

Processing circuitry 18 coupled to the acquisition module and is configured to process the social media data to generate processed data. The processed data can be used to determine various activities around the input data that was provided by the data analyst. For example, if the input data was a specific product, the social media data is processed to determine a buzz around the product, positive and negative sentiments about the product, the different geographical locations that are impacting the product, people that are influencing the product's sales and the like. In one embodiment, these various activities are presented to the data analyst user in the form of visual representations such as graphs, charts, etc.

Memory circuitry 20 is coupled to processing circuitry and configured to store the social media data, processed data and the one or more visual representations that are generated by the processing circuitry 18. The manner is which processing circuitry analyses the social media data is described in further detail below.

Figure 2:
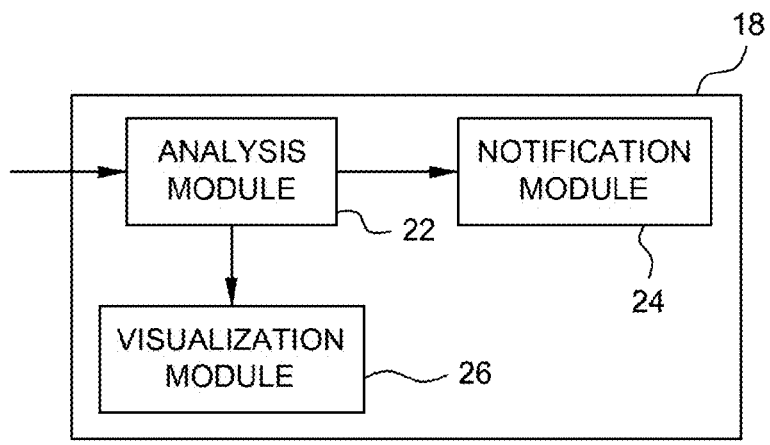
FIG. 2 is a block diagram of an embodiment of processing circuitry implemented according to aspects of the present technique.

FIG. 2 is a block diagram of an embodiment of processing circuitry implemented according to aspects of the present technique. Processing circuitry 18 comprises analysis module 22, notification module 24 and visualization module 26. Each component is described in further detail below.

Analysis module 22 is configured to receive the social media data from various social media platforms. The social media data corresponds to input data provided by a data analyst. In one embodiment, the analysis module is configured to pre-process the social media data to filter non-relevant data. Several well known models can be applied such as spam filtering algorithms to remove content not related to the business, "part of speech tagging" to extract language components like nouns, verbs, adjectives, etc. In addition, stemming operations to normalize of text data and other custom filters like removal of stop words i.e., generic words which do not make any sense during analysis like a, an, the etc., phone numbers, email ids, etc may also be applied.

The analysis module 22 is configured to analyze the social media data and generate processed data. In one embodiment, text analysis models are applied on the social media data. Examples of text analysis models include text frequency analysis, sentiment analysis and topic modeling. Further, the analysis module is configured to access historical data pertinent to the input data while processing the social media data. Such historical data is stored in memory circuitry 20.

Further, the analysis module 22 is configured to classify the processed data based on a plurality of criteria. Examples of such criteria include sentiments, geographic locations, authors, and the like. In one embodiment, the criteria are selected by the user. The criteria may be presented to the user as a drop down menu, check box menu, etc. In one embodiment, the data analyst is provided an option to select more than one criterion for classification.

Notification module 24 is coupled to the analysis module 24 and is configured to generate a plurality of alerts to one or more users based on the input data. These alerts are generated based on the input data and the processed data and can be sent regularly over a selected period of time.

Visualization module 26 is coupled to the analysis module 22 and is configured to generate a plurality of visual representations of processed data classified based on the plurality of criteria. The visual representations aid in presenting a complete picture of the social media data that was retrieved. These representations allow a data analyst to make informed decisions on a product or a business. The manner in which social media data is processed and visual representations are generated are described in further detail below.

Figure 3:
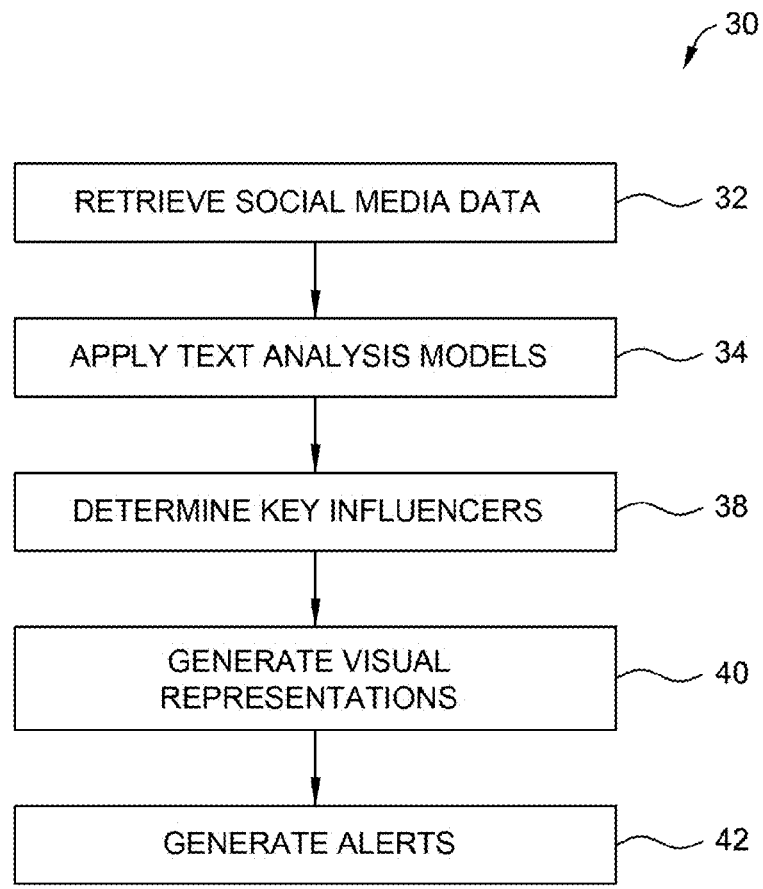
FIG. 3 is a flow chart illustrating one method by which social media data is analyzed.

FIG. 3 is a flow chart illustrating one method by which social media data is processed according to aspects of the present technique. As described above, social media data refers to data retrieved from social media platforms that exist today. In one embodiment, the data is retrieved in real-time. The process 30 for analyzing social media data is described in further detail below.

At step 32, social media data is retrieved from one or more social media platforms. The social media data is retrieved in response to input data provided by a data analyst. In general, input data may include keywords for a certain product, the product name, a name of a business or an organization, etc. In one embodiment, social media data includes text strings.

When the social media data is retrieved, data analysis operations are performed on the social media data. In the illustrated embodiment, the data analysis operations include text analysis as described in detail below with reference to step 34 and 36. However, it must be understood to one skilled in the art, that other data analysis operations may also be performed on the social media data.

At step 34, a text analysis model is applied on the social media data to generate a cluster of text data. Text analysis models typically structure the social media data, determine specific patterns within the structured data, and evaluate and interpret the data. In one embodiment, the social media data is first pre-processed using standard pre-processing algorithms to filter non-relevant data before applying the text analysis model.

Examples of text analysis models include frequency analysis, sentiment analysis and topic modeling. In one embodiment, text data frequency analysis is performed on the text data to determine a number of times certain words of interest repeat within the extracted text data.

In one embodiment, sentiment analysis models are applied on the cluster of text data to generate a sentiment analysis data spectrum. Sentiment analysis models are used to classify the text data according to one or more sentiments that is expressed. In one embodiment, the text data is classified based on a positive sentiment, a neutral sentiment and a negative sentiment.

In another embodiment, topic modeling is performed on the text data. Topic modeling schemes enable the identification of several themes that are present in the text data. Further, the topic modeling schemes determine a relative importance of each word within a topic.

At step 38, a set of key influencers is determined based on the text data and the sentiment analysis data spectrum. Typically, an online user's influence is determined by analyzing the online profile of the user. Key influencers may be persons whose reputation and influence may impact the business or product. For example, an author of weblogs or other publications, or a person who comments or participates in online discussions may be considered to have expertise in certain categories or contexts. It is often advantageous to understand the manner in which such influencers impact a product or a business.

At step 40, visual representations are created to illustrate to the data analyst the various results based on the text analysis and the sentiment analysis performed on the social media data. In one embodiment, the visual representations comprise trend and distribution charts. Such charts assist a user in making creating informed and accurate strategies for a product or a business.

At step 42, alerts and notifications are generated and provided to a plurality of users. In one embodiment, the alerts are configured to progressively display more information in response to received input data. In particular, for example, an alert may initially provide a first level of information or detail about a particular product. In response to the data analysis steps 34 and 36 described above, a subsequent alert may provide a second level of information or detail (e.g., more information or detail than is provided in the first level) about the product. In one embodiment, the alerts and notifications are provided for a particular period of time.

The technique described above can be performed by the data analysis system described in FIG. 1 and FIG. 2. The technique described above may be embodied as devices, systems, methods, and/or computer program products. Accordingly, some or all of the subject matter described above may be embodied in hardware and/or in software (including firmware, resident software, micro-code, state machines, gate arrays, etc.) Furthermore, the subject matter may take the form of a computer program product such as an analytical tool, on a computer-usable or computer-readable storage medium having computer-usable or computer-readable program code embodied in the medium for use by or in connection with an instruction execution system. In the context of this description, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 4:
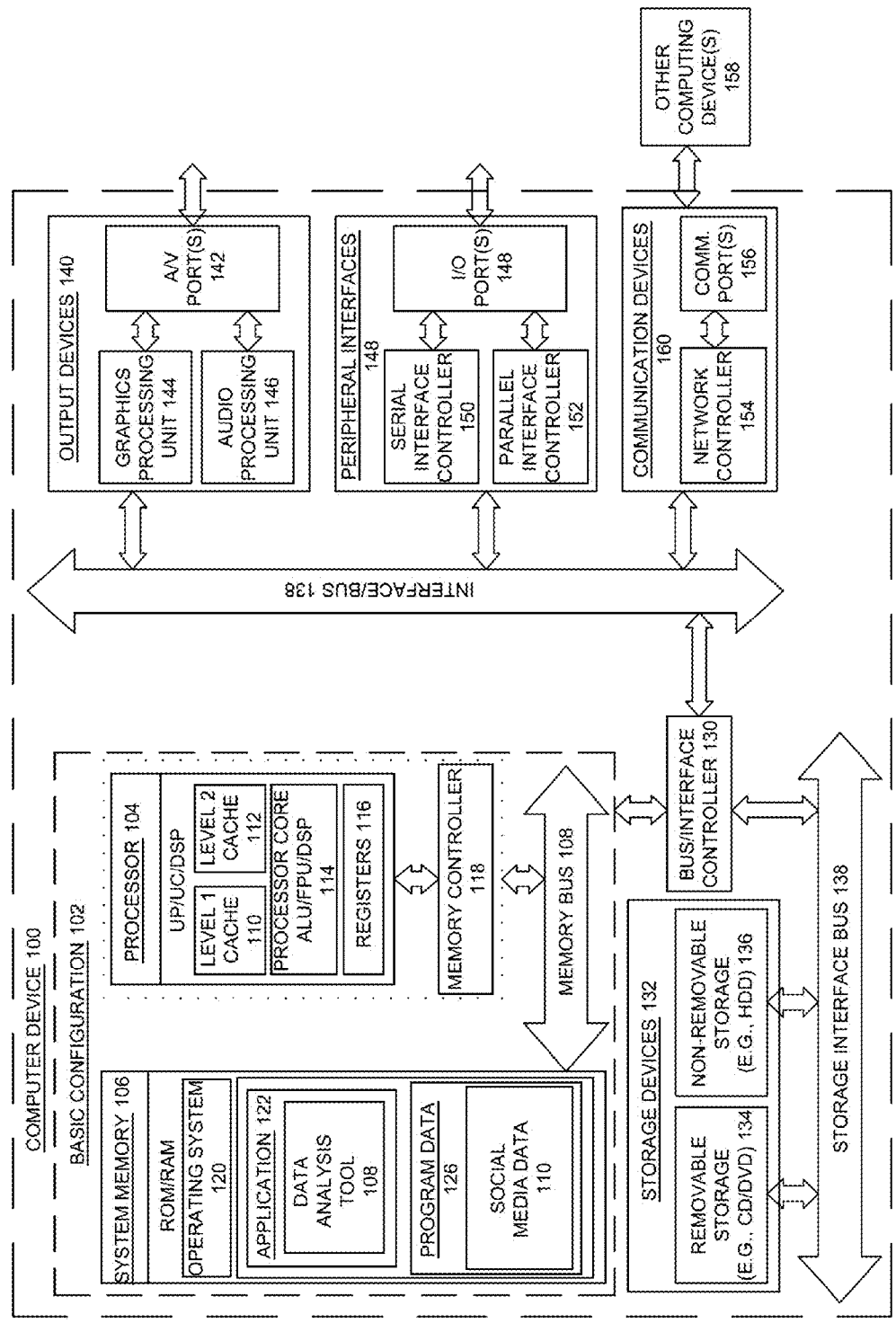
FIG. 4 is a block diagram of a general purpose computer implemented according to aspects of the present technique; and FIG. 5 to FIG. 13 illustrates example screen shots of a graphical user interface implemented according to aspects of the present technique.

FIG. 4 is a block diagram illustrating an embodiment of a computer 100 that is configured to analyze social media data retrieved from various social media platforms. The computer 100 is configured to execute instructions for a data analysis tool that performs the steps described in FIG. 3. In a very basic configuration 102, computer 100 typically includes one or more processors 104 and a system memory 106. A memory bus 124 may be used for communicating between processor 104 and system memory 106.

Depending on the desired configuration, processor 104 may be of any type including but not limited to a microprocessor (µP), a microcontroller (µC), a digital signal processor (DSP), or any combination thereof. Processor 104 may include one more levels of caching, such as a level one cache 110 and a level two cache 112, a processor core 114, and registers 116. An example processor core 114 may include an arithmetic logic unit (ALU), a floating point unit (FPU), a digital signal processing core (DSP Core), or any combination thereof. An example memory controller 118 may also be used with processor 104, or in some implementations memory controller 118 may be an internal part of processor 104.

Depending on the desired configuration, system memory 106 may be of any type including but not limited to volatile memory (such as RAM), non-volatile memory (such as ROM, flash memory, etc.) or any combination thereof. System memory 106 may include an operating system 120, one or more applications 122, and program data 124. Application 122 include a data analysis tool 120 that is arranged to analyze social media data received from several social media platforms. Program data 126 may include social media data. In some embodiments, application 122 may be arranged to operate with program data 126 on operating system 120 such that interaction between the dispensing devices and external entities are monitored. This described basic configuration 102 is illustrated in FIG. 4 by those components within the inner dashed line.

Computer 100 may have additional features or functionality, and additional interfaces to facilitate communications between basic configuration 102 and any required devices and interfaces. For example, a bus/interface controller 130 may be used to facilitate communications between basic configuration 102 and one or more data storage devices 132 via a storage interface bus 138. Data storage devices 132 may be removable storage devices 134, non-removable storage devices 136, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 106, removable storage devices 134 and non-removable storage devices 136 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computer 100. Any such computer storage media may be part of computer 100.

Computer 100 may also include an interface bus 138 for facilitating communication from various interface devices (e.g., output devices 140, peripheral interfaces 148, and communication devices 160) to basic configuration 102 via bus/interface controller 130. Example output devices 142 include a graphics processing unit 144 and an audio processing unit 146, which may be configured to communicate to various external devices such as a display or speakers via one or more A/V ports 142. Example peripheral interfaces 148 include a serial interface controller 150 or a parallel interface controller 152, which may be configured to communicate with external devices such as input devices (e.g., keyboard, mouse, pen, voice input device, touch input device, etc.) or other peripheral devices (e.g., printer, scanner, etc.) via one or more I/O ports 148. An example communication device 160 includes a network controller 154, which may be arranged to facilitate communications with one or more other computer s 158 over a network communication link via one or more communication ports 156.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computer 100 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computer 100 may also be implemented as a personal computer including both laptop computer and non-laptop computer configurations. As described above, the data analysis tool and system is configured to analyze social media data retrieved from social media platforms. The data analysis tool and system may include a graphical user interface to facilitate a user to provide input data. Some example user interface screens are described below with reference to FIG. 5 through FIG. 11.

Figures 5, 6:
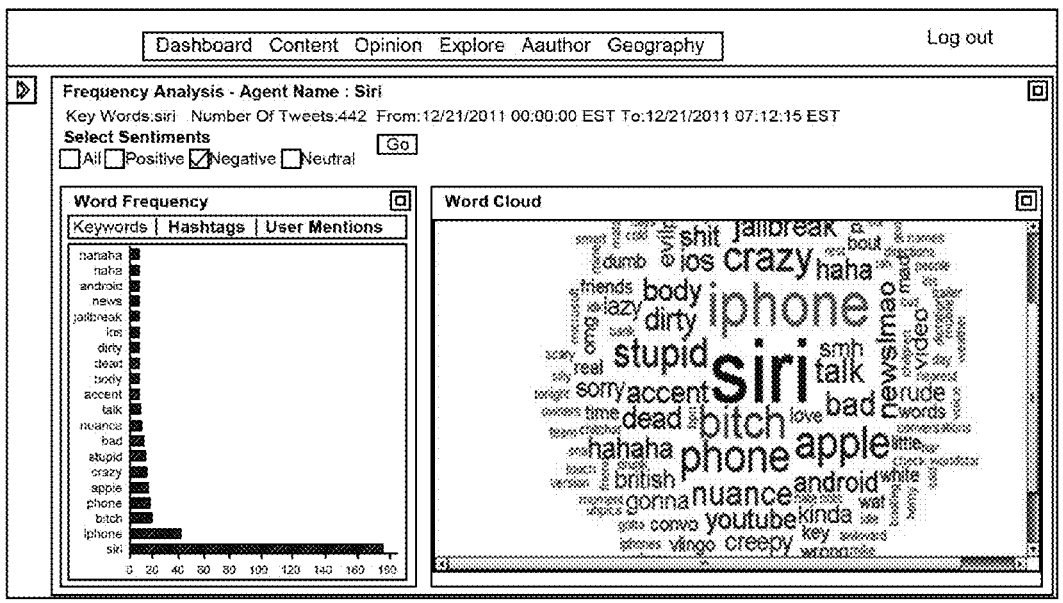

FIG. 5 is a screen shot of a graphical user interface that enables a data analyst to provide input data to the data analysis system. The data analysis system enables the data analyst to provide a selection of key words in a tab provided as shown in screen 44. The data analyst may also provide information related to the keywords that are not relevant. In addition, the data analyst may select the various social media platforms of interest.

FIG. 6 is a screen shot of a visual representation of negative sentiment data classified from a social media data. As can be clearly seen, the screen shot 48 demonstrates the classification of the text data based on positive, negative and neutral sentiments. The screen shot 48 illustrates the negative words and a frequency of the negative words. The screen shot 46 of FIG. 7 illustrates the frequency of positive tweets, negative tweets and neutral tweets retrieved for various groups in response the input data "Xbox".

Figures 7, 8:
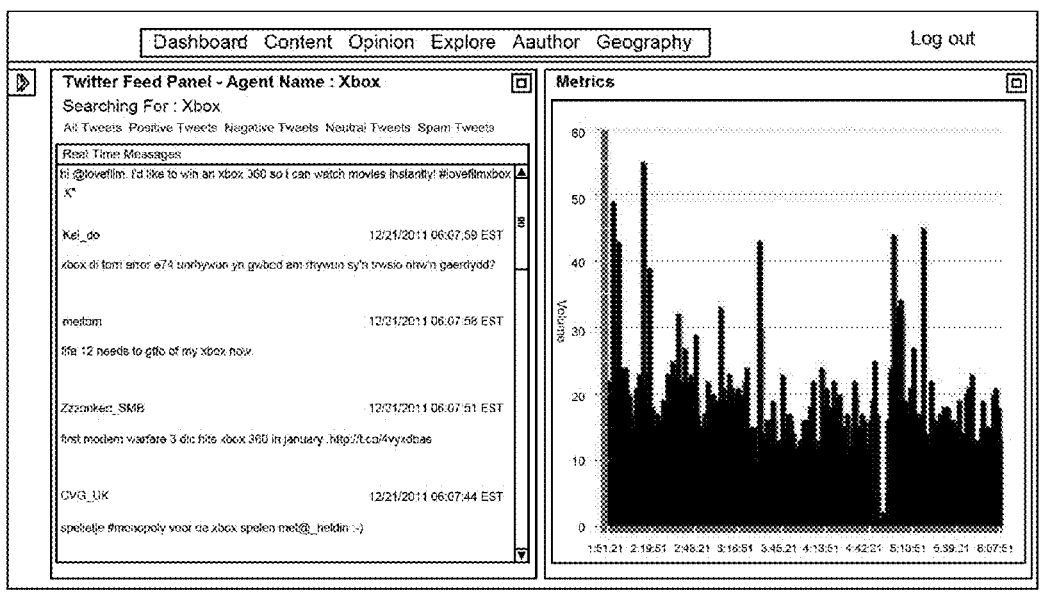
Figure 9:
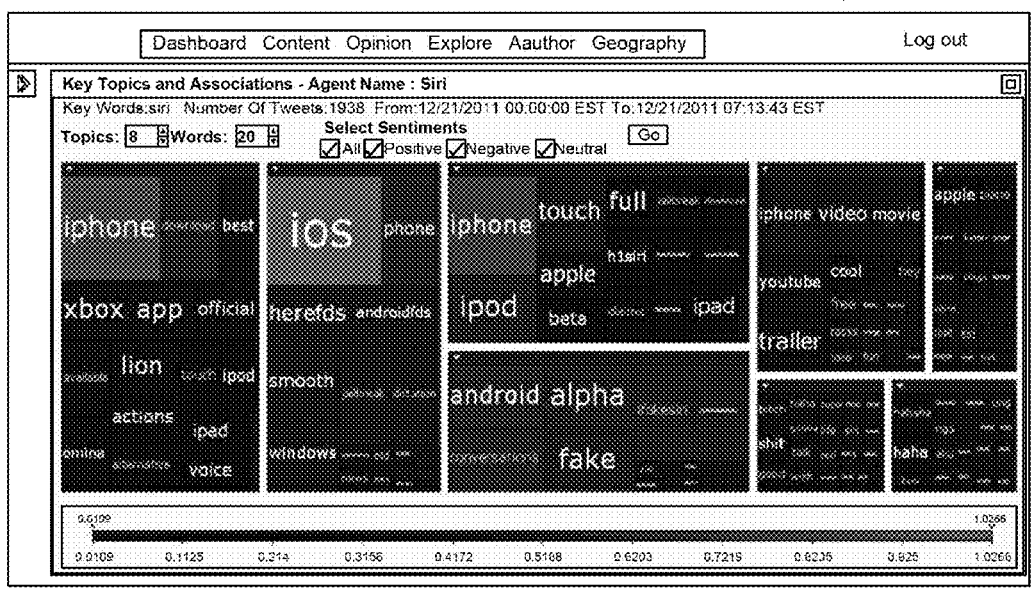

Similarly, the screen shot 52 illustrates all social media data retrieved for the input data "xbox" as shown in FIG. 8. The bar chart illustrates the frequency of the input data at different instants of time. FIG. 9 illustrates the various topics that have been derived for the input data "Siri". Topic modeling schemes enable the identification of several themes that are present in the text data. Further, the topic modeling schemes determine a relative importance of each word within a topic. For example in screen shot 52, the words, which are more relevant, are indicated in larger boxes. In one embodiment, a color scheme is also implemented to indicate the relevancy of each word.

Figure 10:
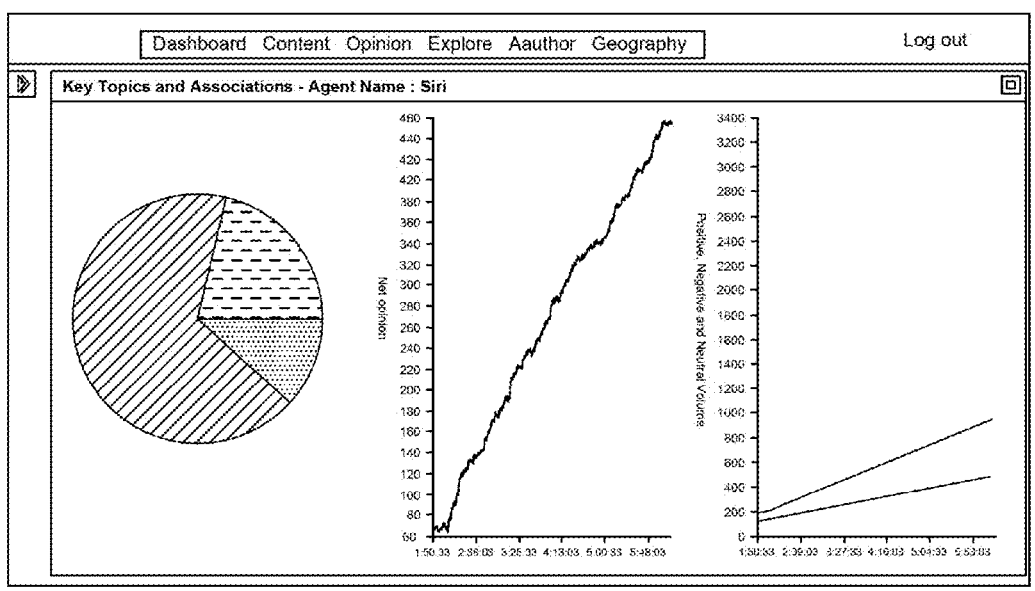
Figure 11:
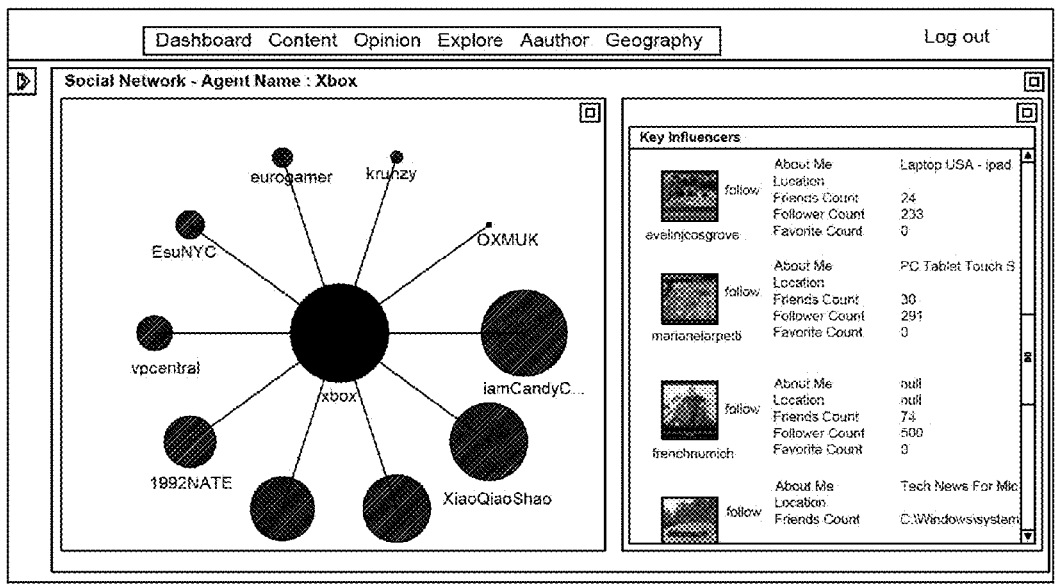
Figure 12:
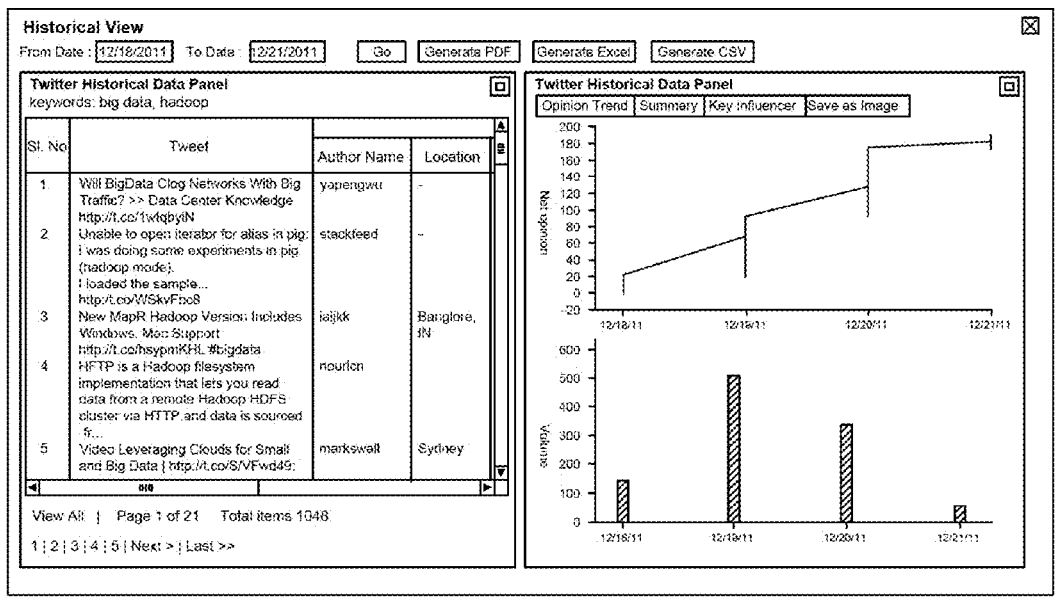
Figure 13:
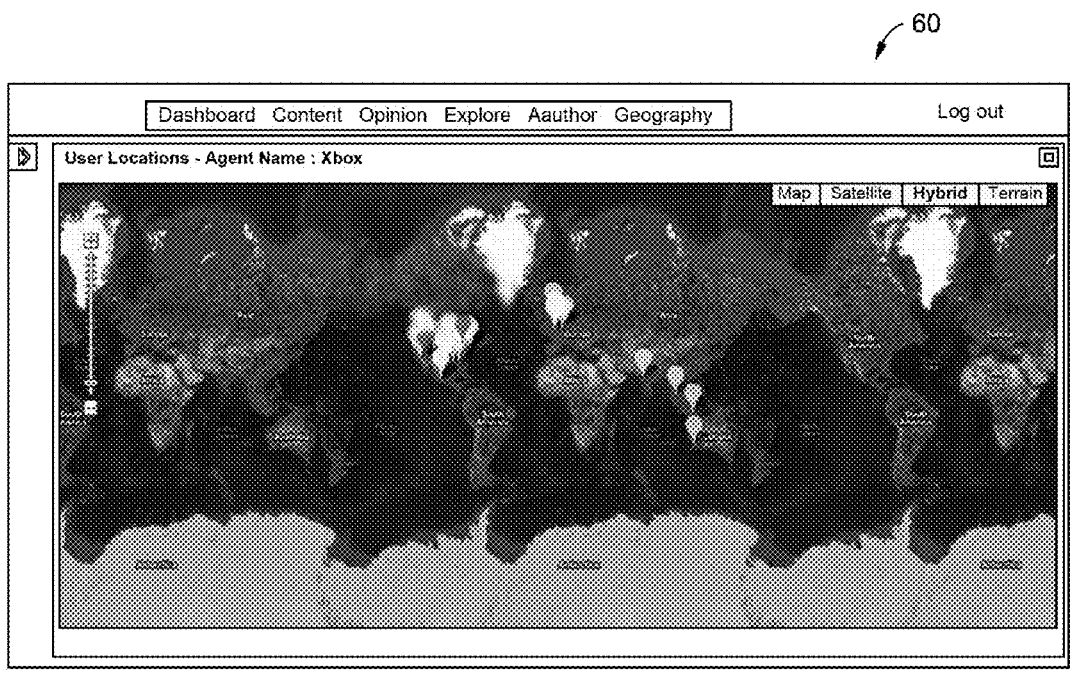

FIG. 10 illustrates opinion trends for the input data "xbox". Screen shot 54 illustrates the positive and negative opinion graph for the input data as seen on Dec. 21, 2011. FIG. 11 illustrates key influencers for the input data "xbox". As can be seen in screen shot 56, the key influencers are identified. In addition, the social profile of each influencer is also made readily available. FIG. 12 illustrates historical data from Twitter for the input data "Big Data" and "Hadoop". Screen shot 58 illustrates tweets retrieved from Twitter for the input data and corresponding metrics. FIG. 13 is a screen shot illustrating the various geographic locations associated with the text data. Screen shot 60 illustrated the source of text data on a world map as shown.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for analyzing data to determine an activity around a product, the system comprising:
   a user interface configured to enable one or more data analysts to provide input data regarding the product; and
   a computer processor configured to,
   retrieve social media data in response to the input data, wherein the social media data is received from one or more social media platforms, apply text analysis to the social media data, the text analysis being based on at least one of frequency analysis, sentiment analysis and topic modeling,
   determine a set of users associated with the retrieved social media data as key influencers, the key influencers indicating how social status of the set of users associated with the social media data influence commercialization of the product,
   generate processed data based on the applied text analysis and the determined key influencers,
   generate a plurality of visual representations associated with the processed data to be presented to the one or more data analysts via the user interface, and
   present, simultaneously with one or more of the plurality of visual representations, a social profile of each user from among the key influencers to the one or more data analysts via the user interface, wherein the social profile of each user from among the key influencers includes at least information about a device associated with the user, a location associated with the user, a number of friends of the user, a number of other users considering the user as favorite, and a number of followers of the user.

2. The system of claim 1, further comprising:
   a memory in communication with the computer processor and configured to store the social media data, the processed data and the plurality of visual representations.

3. The system of claim 1, wherein the computer processor is further configured to,
   pre-process the social media data to filter non-relevant data, and
   apply the text analysis to the pre-processed social media data.

4. The system of claim 1, wherein the computer processor is further configured to generate a plurality of alerts to be sent to the one or more data analysts based on the input data, each of the plurality of alerts indicating a progress in generation of the processed data.

5. The system of claim 1, wherein the computer processor is configured to,
   access historical data pertinent to the input data, and
   utilize the historical data in generating the processed data.

6. The system of claim 1, wherein the sentiment analysis includes classifying the social media data based on a positive sentiment, a neutral sentiment and a negative sentiment.

7. The system of claim 1, wherein the plurality of visual representations include trend and distribution charts.

8. A method utilizing at least a computing device for analyzing data received from a plurality of social media platforms, the method comprising:
   retrieving social media data in response to the input data, wherein the social media data is received from one or more social media platforms;
   applying text analysis to the social media data, the text analysis being based on at least one of frequency analysis, sentiment analysis and topic modeling;
   determining a set of users associated with the retrieved social media data as key influencers, the key influencers indicating how social status of the set of users associated with the social media data influence commercialization of the product;
   generating processed data based on the applied text analysis and the determined key influencers;
   generating a plurality of visual representations associated with the processed data to be presented to the one or more data analysts via the user interface, and
   presenting, simultaneously with one or more of the plurality of visual representations, a social profile of each user from among the key influencers to the one or more data analysts via the user interface, wherein the social profile of each user from among the key influencers includes at least information about a device associated with the user, a location associated with the user, a number of friends of the user, a number of other users considering the user as favorite, and a number of followers of the user.

9. The method of claim 8, further comprising:
   storing the social media data, text data and the plurality of visual representations.

10. The method of claim 8, further comprising:
    pre-processing the social media data to filter non-relevant data, upon retrieving the social media data, wherein
    the applying applies the text analysis to the pre-processed social media data.

11. The method of claim 8, further comprising:
    mapping the social media data to a plurality of geographic locations, wherein the generating further generates the processed data based on the plurality of geographical locations.

12. The method of claim 8, further comprising:
    generating a plurality of alerts based on the input data, each of the plurality of alerts indicating a progress in generation of the processed data.

13. The method of claim 8, further comprising:
    accessing historical data pertinent to the input data, wherein
    the generating further generates the processed data based on the historical data.

14. The method of claim 8, wherein the sentiment analysis includes classifying the social media data based on a positive sentiment, a neutral sentiment or a negative sentiment.

15. A non-transitory computer readable medium including a computer program product, the computer program product comprising instructions, which when executed by a processor, cause the processor to analyze data received from a plurality of social media platforms, by:
    retrieving social media data from the plurality of social media platforms based on an input data provided by one or more data analysts;
    by applying text analysis to the social media data, the text analysis being based on at least one of frequency analysis, sentiment analysis and topic modeling;
    determining a set of users associated with the social media data as key influencers, the key influencers indicating how social status of the set of users associated with the social media data influence commercialization of the product;
    generating processed data based on the applied text analysis and the determined key influencers;
    generating a plurality of visual representations associated with the processed data to be presented to the one or more data analysts via the user interface, and
    presenting, simultaneously with one or more of the plurality of visual representations, a social profile of each user from among the key influencers to the one or more data analysts via the user interface, wherein the social profile of each user from among the key influencers includes at least information about a device associated with the user, a location associated with the user, a number of friends of the user, a number of other users considering the user as favorite, and a number of followers of the user.

* * * * *